United States Patent [19]
Fulmer

[11] Patent Number: 4,569,559
[45] Date of Patent: Feb. 11, 1986

[54] HEIGHT SENSING PROPORTIONING VALVE

[75] Inventor: Keith H. Fulmer, Mishawaka, Ind.

[73] Assignee: Allied Corporation, Morristown, N.J.

[21] Appl. No.: 616,524

[22] Filed: Jun. 4, 1984

[51] Int. Cl.$^4$ ............................................. B60T 8/22
[52] U.S. Cl. ................................................. 303/6 C
[58] Field of Search ............ 188/195; 303/6 C, 22 R, 303/56; 251/65

[56] References Cited

U.S. PATENT DOCUMENTS 4,090,740  5/1978  Farr ................................. 303/22 R Primary Examiner—Duane A. Reger
Attorney, Agent, or Firm—Ken C. Decker

[57] ABSTRACT

A height sensing proportioning valve comprises a housing with a bore receiving a valve number and a poppet member. A control assembly extends into a pocket defined by the housing in spaced relation to the bore to control the setting of the poppet member. The control assembly and the poppet member are provided with magnets.

11 Claims, 1 Drawing Figure

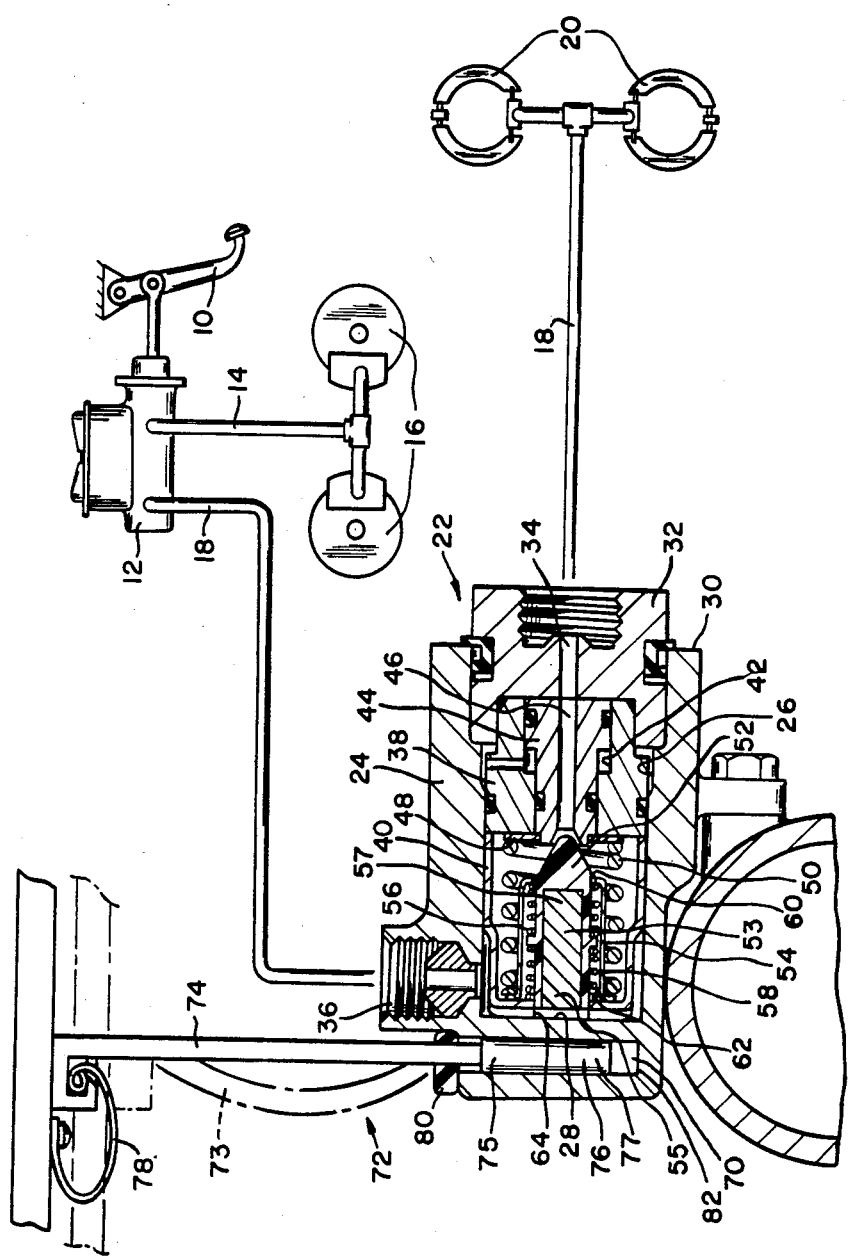

HEIGHT SENSING PROPORTIONING VALVE

This invention relates to a height sensing proportioning valve which is operable to alter fluid pressure communicated to a pair of rear brakes in response to the load carried by a vehicle.

In a vehicle a body is supported via springs on a suspension or frame of the vehicle. As the vehicle is loaded with people or objects, the vehicle body approaches the vehicle frame in response to the springs being contracted. A brake application communicates fluid pressure to a pair of rear brakes. If the vehicle is unloaded too much fluid pressure communicated to the rear brakes will cause the rear wheels to lock up. The height sensing proportioning valve is responsive to the relative positions of the body and the frame and to the fluid pressure generated during the brake application to reduce fluid pressure communicated to the rear brakes. If the vehicle is loaded the rear wheels will remain fully engaged with the road surface so that a higher level of fluid pressure can be communicated to the rear brakes. It is the function of the height sensing proportioning valve to sense whether the vehicle is loaded as a function of the position of the vehicle body relative to the vehicle frame, and to modulate fluid pressure communicated to the rear brakes.

Heretofore, a lever has been coupled to the vehicle to move in response to movement of the vehicle frame. The lever is also directly engaged with a part of the proportioning valve to alter the operation of the latter when the vehicle is loaded. With the lever directly connected to the proportioning valve, a housing supporting the proportioning valve must be apertured to expose the proportioning valve so that an added potential leak point is established for the proportioning valve.

The present invention covers a height sensing proportioning valve for a vehicle comprising a housing with an inlet opening receiving fluid from a master cylinder and an outlet opening communicating fluid to a brake assembly, a valve member movably carried within a housing bore and defining a passage communicating the inlet and the outlet opening, a pilot member opposing the valve member and cooperating therewith to alter fluid flow through the passage in response to movement of the valve member and a control assembly cooperating with one of the members to vary the cooperation between the members in response to the relative positions of the vehicle frame and the vehicle body, characterized in that said control assembly cooperates with said one member in the absence of further openings in the housing leading to the fluid communicated through the housing.

It is an advantage of the invention that the housing is provided with only two openings to accomodate fluid communication therethrough.

The sole drawing shows a brake system with a height sensing proportioning valve illustrated in cross section.

The brake system includes a brake pedal 10 coupled to a master cylinder 12 to generate fluid pressure therein during braking. A first conduit 14 communicates fluid pressure to a pair of front brakes 16 and a second conduit 18 communicates fluid pressure to a pair of rear brakes 20 via the height sensing proportioning valve 22.

The height sensing proportioning valve 22 defines a housing 24 of aluminum construction with a bore 26 extending from a bottom surface 28 to an open end 30. A plug 32 closes the end 30 of the bore and forms an opening 34 defining an outlet leading to the brakes 20 via conduit 18. The housing 24 is provided with an aperture 36 leading to the bore 26 adjacent the bottom surface 28. The aperture 36 forms an inlet communicating with the master cylinder 12 via the conduit 18. A spacer 38 is retained in the bore 26 by the plug and a cup 40 extends from the spacer 38 to the bottom surface 28. A stepped opening 42 in the spacer 38 movably and sealingly receives a valve member 44. The valve member defines a passage 46 communicating with the plug opening 34. A small diameter end of the valve member opposes a washer 48 biased by a spring 50 against an end of the spacer. A poppet member 52 is carried by a cage 54 within the cup 40 to oppose the passage 46. A pair of springs 56, 58 bias the poppet member to a neutral position spaced from the bottom surface 28 and also spaced from the passage 46. The cage 54 is held against the cup 40 by the spring 50 and an aperture 60 on the cage permits the poppet member to extend outwardly from the cage to oppose the valve member passage 34. Similarly, the cage 54 and cup 40 are apertured at 62 and 64, respectively, to permit the poppet member to be moved into engagement with the bottom surface 28. The poppet member 52 carries a magnet 53 for a purpose described hereinafter, with a north pole 55 facing the bottom surface 28 and a south pole 57 at the end of the poppet member facing the passage 46.

The housing 24 further defines a pocket 70 separate from the bore 26 to receive a control assembly 72. The control assembly 72 comprises a first part 74 resiliently coupled via a spring clip 78 to the vehicle body and a second part 76 carried within the pocket 70. A gasket 80 prevents the ingress of contaminates into the pocket 70. The first part 74 comprises a flexible strip which is sufficiently rigid in a longitudinal direction to move the second part 76 in the pocket 70 in response to movement of the vehicle body relative to the vehicle frame. However, when the second part 76 abuts a bottom wall 82 of the pocket 70, the flexible strip is deflected transversely as shown in phantom at 73. The second part 76 comprises a magnet with a south pole 75 adjoining the first part and a north pole 77 facing the bottom wall.

In the normally unloaded position illustrated, the magnet 76 is disposed in the middle of pocket 70 spaced from the bottom wall 82. With the north and south poles of magnet 76 equidistant from the magnet 53 of the poppet member, the poppet member will remain in its normal position slightly spaced from the valve member. Movement of the valve member toward the poppet member in response to fluid pressure in the bore 26 will reduce the opening for passage 46 to reduce fluid pressure communicated to the brakes 20. When the vehicle is loaded, the magnet 76 will be moved toward the bottom wall 82 to align the south pole 75 with the north pole 55 of magnet 53. The south pole 75 will exert a force on the north pole 55 to move the poppet member 52 toward the bottom surface 28 and away from the passage 46. Consequently, when the fluid pressure in bore 26 moves the valve member 44 toward the poppet member 52 against spring 50, it will require a higher fluid pressure level in bore 26 and longer travel for member 44 to initiate reduction of fluid pressure communication to brakes 20, than when the vehicle is unloaded. Therefore, higher fluid pressure will be communicated to the rear brakes 20 when the vehicle is loaded as compared to unloaded.

With the pocket 70 extending transversely at the end of the housing 24 outside of the bore 26, the poppet member 52 is completely immersed in fluid and conventional tube fittings at opening 36 and at opening 34 will completely seal the fluid communicated through the housing.

I claim:

1. A height sensing proportioning valve for a vehicle comprising a housing with an inlet opening receiving fluid from a master cylinder and an outlet opening communicating fluid to a brake assembly, a valve member movably carried within a housing bore and defining a passage communicating the inlet and the outlet opening, a poppet member opposing the valve member and cooperating therewith to alter fluid flow through the passage in response to movement of the valve member, and a control assembly cooperating with one of the members to vary the cooperation between the members in response to the relative positions of the vehicle frame and the vehicle body, characterized in that said control assembly cooperates with said one member in the absence of further openings in the housing leading to the fluid communicated through the housing, and in that said control assembly includes a magnet and said one member also includes a magnet.

2. The height sensing proportioning valve of claim 1 in which said housing defines a pocket spaced from said housing bore and said control assembly carries its magnet within said pocket.

3. The height sensing proportioning valve of claim 2 in which said pocket extends from an open end to a bottom wall, said control assembly magnet is normally disposed at an intermediate location in said pocket.

4. A height sensing proportioning valve for a vehicle comprising a housing with an inlet opening receiving fluid from a master cylinder and an outlet communicating fluid to a brake assembly, a valve member movably carried within a housing bore and defining a passage communicating the inlet and the outlet opening, a poppet member opposing the valve member and cooperating therewith to alter fluid flow through the passage in response to movement of the valve member, and a control assembly cooperating with one of the members to vary the cooperation between the members in response to the relative positions of the vehicle frame and the vehicle body, characterized in that said control assembly cooperates with said one member in the absence of further openings in the housing leading to the fluid communicated through the housing, and in that said housing bore extends from an open end to a bottom surface, said one member being disposed adjacent said bottom surface but spaced therefrom to permit said control assembly to move said one member toward said bottom surface.

5. A height sensing proportioning valve for a vehicle comprising a housing with an inlet opening receiving fluid from a master cylinder and an outlet opening communicating fluid to a brake assembly, a valve member movably carried within a housing bore and defining a passage communicating the inlet and the outlet opening, a poppet member opposing the valve member and cooperating therewith to alter fluid flow through the passage in response to movement of the valve member, and a control assembly cooperating with one of the members to vary the cooperation between the members in response to the relative positions of the vehicle frame and the vehicle body, and means providing a magnetic coupling between said control assembly and said one member, whereby said control device varies the cooperation between said members without additional openings in the housing other than said inlet opening and said outlet opening.

6. The height sensing proportioning valve as claimed in claim 5, wherein said means providing a magnetic coupling includes a magnet carried by said control assembly.

7. The height sensing proportioning valve as claimed in claim 6, wherein said housing defines a pocket receiving said control assembly, said pocket being separated from said housing bore by a portion of said housing.

8. The height sensing proportioning valve as claimed in claim 6, wherein said means providing a magnetic coupling further includes a magnet carried by said one member.

9. The height sensing proportioning valve as claimed in claim 7, wherein said means providing a magnetic coupling further includes a magnet carried by said one member.

10. The height sensing proportioning valve as claimed in claim 8, wherein said means providing a magnetic coupling includes a magnet carried by said one member.

11. The height sensing proportioning valve as claimed in claim 10, wherein said housing defines a pocket receiving said control assembly, said pocket being separated from said housing bore by a portion of said housing.

* * * * *